Jan. 22, 1952     J. S. McCORKLE     2,583,004
UNDERWATER EXPLOSION GAUGE
Filed May 3, 1949
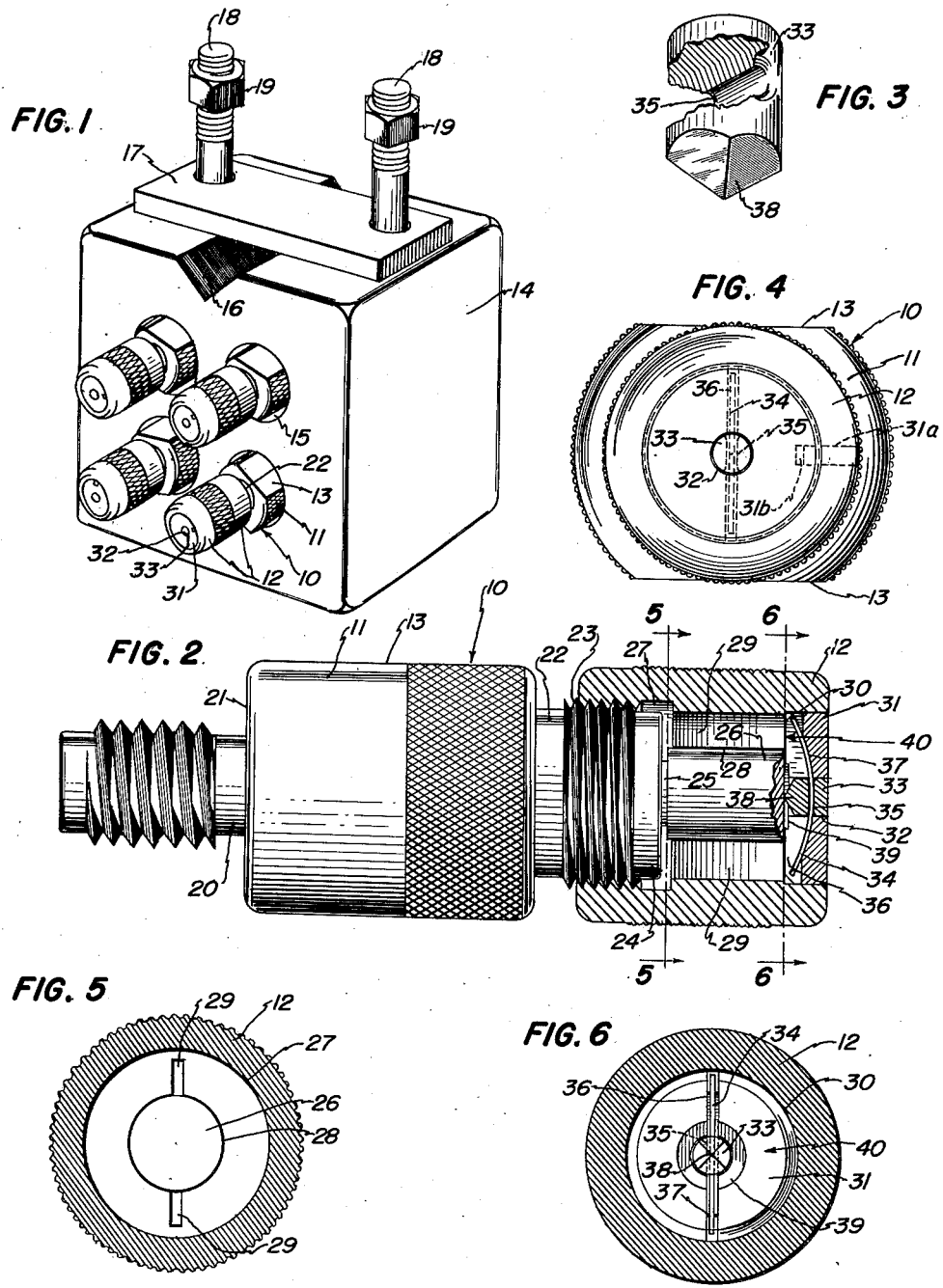
INVENTOR
JAMES S. McCORKLE
BY
ATTORNEY Patented Jan. 22, 1952

2,583,004

UNITED STATES PATENT OFFICE 2,583,004

UNDERWATER EXPLOSION GAUGE

James S. McCorkle, Hinton, W. Va.

Application May 3, 1949, Serial No. 91,205

7 Claims. (Cl. 73—35)

(Granted under the act of March 3, 1883, as amended April 30, 1928; 370 O. G. 757)

This invention relates generally to improvements in pressure gages, and its particular purpose is to provide a pressure gage of the indenter type, adapted especially to use in making underwater explosion tests and so contrived as to record peak pressures in a shorter reaction time than hitherto possible.

In the latter respect consistent use has been made of an underwater mechanical explosion shock wave measuring gage known as the Naval Ordnance Laboratory ball crusher gage. That gage possesses several features which commend it, for example simplicity of construction and consistency of operation. It has been found, however, to be too slow in the accurate determination of peak pressures, its reaction time, in other words the interval between the arrival of the shock wave and the deformation of the copper pellet, being about 180 microseconds. Under this circumstance it is necessary to know the time decay constant of the explosion shock wave to determine its peak pressure, and this constant can be found only by use of a complex gage as an auxiliary to the foregoing ball crusher gage.

Underwater explosion tests heretofore have also been made by electric type gages. A gage of that type is necessarily more complicated than any mechanical type of gage, and since the latter is subject to the faults already enumerated it becomes one of the objects of the invention to maintain the simplicity of the mechanical gage and to shorten the reaction time in which the latter makes a record of the peak pressure.

Another object of the invention is to provide a mechanical gage having a time-constant or reaction time of approximately 30 microseconds, enabling the measurement of peak pressure within a small percentage of inaccuracy without having to know the time decay constant for the determination of that pressure.

A further object of the invention is to provide a pressure gage, mechanically constituted to respond so quickly to the impact of an underwater shock wave as to complete its recording function before the front of the shock wave can reach and be reflected from the back of the gage mounting to confound the stroke of the hammer.

Another object of the invention is the accomplishment of the extremely short reaction time through the reduction in mass of the hammer by use of a single, straight wire or leaf spring-type of suspension for the hammer.

Another object of the invention is the assignment to said spring the double function of retaining the hammer in the gage as well as keeping the hammer firmly in contact with the test cylinder.

Another object of the invention is the bringing about of indentation of a copper test piece to provide the decelerating factor for the hammer, thereby to record the displacement of the hammer.

Other objects and many of the attendant advantages of this invention will be readily appreciated as the same becomes better understood by reference to the following detailed description when considered in connection with the accompanying drawings wherein:

Fig. 1 is a perspective view of a typical instaltation, illustrating a bank of four indenter gages mounted in an appropriate block;

Fig. 2 is a central, longitudinal section of one of the gages;

Fig. 3 is a perspective view of the hammer on a scale larger than in Fig. 2, a portion being shown in section;

Fig. 4 is a front end elevation of the gage;

Fig. 5 is a cross section taken on the line 5—5 of Fig. 2, and

Fig. 6 is a cross section taken on the line 6—6 of Fig. 2.

In carrying out the invention the gage, generally designated 10, is made to comprise a body 11 and a cap 12 as well as other parts to which reference is presently made. The body 11 is a solid metal piece which is of cylindrical form with the exception of the flats 13. The flats provide for the application of a wrench by which the gage is screwed home in its mount.

The mount in this instance consists of a metal block 14 which has holes 15 opening on what may be called the working face of the mount, in other words the face which by proper orientation of the mount confronts the source of the explosion shock wave. For that purpose the block is grooved on top as at 16 to receive a suspending rod or its equivalent, a plate 17 which is slid on a pair of studs 18 projecting from the block being clamped against the rod by screwing the nuts 19 down against the plate. At this point it should be stated that the foregoing mount and its manner of suspension do not have to be adhered to in practice, it being conceivable that suitable alternatives can and will be used, depending on local circumstances. In any case, however, it is necessary that the mount 14 shall provide a firm foundation for the gage.

To the latter end each of the holes 15 has a threaded extension (not shown) into which the thread course of a spindle 20 is driven until the adjacent shoulder 21 bears hard against the bottom of the hole. The body 11 is thus functionally made integral with the mount 14, but is removed from the mount each time the gage is read.

Said body has an anvil 22 on its now outer end. A thread course 23 is situated medially of the ends of the anvil so that at least the front extremity 24 is bare of threads, consequently is left smooth as shown. Said extremity is surmounted by a centrally located land 25 against which a copper test cylinder 26 is adapted to rest.

The cap 12 is internally threaded at one end so that it can be screwed onto the thread course 23. A circular relief 27 provides a chamber, in a sense, for the circular land 25 and the contiguous ends of the front extremity 24 and of the test cylinder 26. The inner end of the test cylinder is thus given an unencumbered support which is concentrated on the land 25.

It is noted that land 25 is smaller in perimeter (in this case diameter) than test cylinder 26. The purpose of this is to induce the test cylinder to rotate with the cap 12 rather than with the body 11 when the two are screwed together. During rotation the moment of force on the test cylinder 26 which results from friction with the cap 12 is greater than the moment of force which results from friction with the land 25. These circumstances reduce the amount of scratching of the outer end of the test cylinder by the point of the hammer.

A bore 28 in the axial center of the cap contains the test cylinder, there being but a small clearance around the latter. When the cap 12 is removed after an explosion test, spring pressure behind the text cylinder urges the inner end of said cylinder farther into the circular relief 27 whence it can be extracted from the open end of the cap.

Slots 29 emerge radially from the bore 28, extending in the axial direction from the circular relief 27 to a circular rabbet 30 in the outer or front end of the cap 12. This rabbet is occupied by a lid 31 which is equal in thickness to the depth of the rabbet and comes flush with the front end of the cap. When once put in place, the lid is fixed permanently in any desired way, for example by driving a pin 31a through the side of the cap 12 into a notch 31b in the side of the lid and then soldering both the exposed part of the notch and around the joint between the lid and cap. Thus the lid 31 becomes an integral portion of the cap 12.

The lid 31 has a central bore 32 in which the hammer 33 fits with a small tolerance (approximately .0109). This is large enough to permit the inward movement of the hammer under the impact of the shock wave yet small enough to check any material inseepage of water when the gage is submerged. To the end of confronting the shock wave the exposed end of the hammer is pushed flush with the front surface of the lid when the gage is fully assembled as in Fig. 2, in which position it puts a bow in the spring 34.

This spring consists of a single strand of music wire which loosely occupies a crosshole 35 in the hammer 33, and extends beyond the sides of the hammer into a kerf 36 which registers with the slots 29 and, like said slots, bisects the central bore 32. The purpose of the slots is to admit and guide the spring wire 34 when assembling the hammer in the cap from the open end of the cap. The spring supports the impaled hammer in a plane that cuts the axis of the bore 32 more or less exactly, and with a little care the hammer can be easily dropped into the bore 32 from the inside of the cap. The bottom of the kerf is struck on an arc 37 for a part of its distance, providing a recess into which the spring sinks when bowed by the assembly behind the hammer. Since the spring is under load at that time it serves to hold the pyramidal point 38 of the hammer against the test cylinder 26 with sufficient pressure to prevent any possible inadvertent or unpremeditated end motion of the hammer. The force exerted by the spring on the hammer is so small in comparison with the force exerted by the shock wave that manufacturing variations in spring pressures can be excused as of unimportance.

The spring also serves as a key to retain the hammer in the gage. Although the tight fit of the hammer in the bore 32 would ordinarily preclude the possibility of the hammer slipping out of the bore the spring wire insures against it. The same function could not be derived from a coil spring, the use of which would demand a reorganization of the structure and add an unwanted complexity.

The previously mentioned pyramidal point 38 is made quite blunt. The included angle between opposite faces of the pyramid is about 136° this, however, being a figure that is subject to variation. If the point were made more blunt than thus denoted, the reaction time of the gage can be decreased still further. Although this is a possibility, actual experimentation has shown that the specific end formation of the hammer serves its purpose very well. It produces an adequate indentation in the test cylinder to enable an accurate measurement, the explosion wave pressure being a function of the size of the indentation.

A shallow depression 39 centered on the axis of the lid 31, appearing as a counterbore of the central bore 32, provides an annular shoulder 40 against which the near end of the test cylinder is forced by the assembly in rim contact. The central area of the test cylinder is thus unimpeded for the imprint of the hammer point when the shock wave arrives at its exposed end.

The operation of the gage is readily understood, and its brief review is confined to only one since the operation of the others would be the same. As pointed out before, the body 11 projects from the effective face of the block 14 (Fig. 1) as a fixture of the block. A fresh test cylinder 26 is slid carefully into the bore 28 of the cap 12, whereupon the cap is screwed home by hand on the thread course 23 until stopped by the clamping action of the land 25 and shoulder 40 against the respective ends of the test cylinder.

During the act of screwing the cap home the initially straight spring wire 34 is bowed into the form shown. The erstwhile relaxed spring thus becomes progressively tense, and when finally pushed into the arc 37 of the kerf 36 exerts its greatest force inwardly on the hammer to hold its point against the test cylinder. Upon arrival of the shock wave at the exposed end of the hammer, the latter is displaced inwardly so that the pyramidal point produces the indentation which is measured later.

When pressure is applied to the hammer 33 a finite interval of time is required for the hammer to be accelerated from rest, travel through a displacement distance and then by the resistance of the test cylinder 26 be decelerated to rest. This cycle is conveniently called the gage reaction time, and as stated above the reaction time of the instant gage is approximately 30 microseconds. In other words, the hammer 33 reacts to the impingement of the shock wave on its exposed end to make its maximum indentation in the test cylinder in approximately 30 microseconds.

The method used for computing the gage reaction time is based on the method used for computing the period of a simple spring and bob system which can be imagined as a spring attached to a support at one of its ends and having a bob dangling from its other end. If a force displaces the bob from its rest position it will move up and down at a definite frequency which depends upon the mass of the bob and the restoring force of the spring. This is illustrated in the following equations:

$$f = \frac{1}{2\pi}\sqrt{\frac{K}{M}} \quad (1)$$

where $f$ is frequency
$K$ is the restoring force of the spring
$M$ is the mass of the bob therefore $$T = 2\pi\sqrt{\frac{M}{K}} \quad (2)$$

where $T$ is the period.

Applying this formula to the instant gage, the mass M is essentially the mass of the hammer 33 and the restoring force K is essentially the resistance offered by the test cylinder 25 to the movement of the hammer 33. Since hammer 33, when subjected to pressure, starts from zero velocity, accelerates to a maximum velocity and again decelerates to zero velocity, one half period is said to have occurred. The gage reaction time can then be determined by substituting the numerical values for M and K in Equation 2 and solving for one half period, ½T.

Owing to the fact that (1) the pressure applied by an explosion shock wave is exponential in character, (2) the restoring force of the test cylinder is not linear, and (3) there is additional mass owing to the water in contact with the hammer and of the copper which is displaced by the point of the hammer, the actual computation is more complicated than outlined above but the same principle applies.

Reverting to the instant hammer cycle, its extremely rapid reaction time is due to several features of the gage. First, the physical size of the hammer 33 is reduced to a minimum. It is a plain, cylindrical piece, bluntly pointed at one end and having a direct and unobstructed approach to the test cylinder. Since it fits the bore 32 of the lid 31 with only a small tolerance it does not require supplemental means, such as a washer, to center it or aid in its support.

Second, the leaf-type spring 34 is relied on to retain the hammer in the gage and at the same time keep the point 38 firmly against the test cylinder. This enables the confinement of the hammer to the foregoing cylindrical configuration, since there are no outcroppings, for example a flange as in the ball crusher gage, to add to the mass. Third, a large restoring force or factor of deceleration is achieved by making the indenting point of the hammer blunt.

Obviously many modifications and variations of the present invention are possible in the light of the above teachings. It is therefore to be understood that within the scope of the appended claims the invention may be practiced otherwise than as specifically described.

The invention herein described may be manufactured and used by or for the Government of the United States of America for governmental purposes without the payment of any royalties thereon therefor.

What is claimed is:

1. In an explosion gage, a body having an anvil, a cap screwed onto the anvil and having a bore to contain a test piece for engagement at one end with the anvil, a hammer slidable in the cap and having a point directed to the other end of the test piece, and a spring for the hammer, said spring consisting of a single leaf-type wire transfixing the hammer and engaging an internal portion of the cap to enable confining the hammer to a simple cylinder with no outcroppings, and thereby keying the hammer in place and pressing the hammer against said other end of the test piece.

2. In an explosion gage, a body having an anvil, a cap screwed onto the anvil, said cap having a bore to contain a test piece for engagement at one end with the anvil and having a kerf in bisecting relation to the bore, a hammer slidable in the cap and having a crosshole, and a single spring wire occupying the crosshole, said wire occupying the kerf and assuming a bowed shape therein respectively to key the hammer in place and to press the hammer against the other end of the test piece.

3. In an explosion gage, a body having an anvil, cap screwed onto the anvil and having a bore to contain a test piece for engagement with one end of the anvil, a lid forming part of the cap, said lid having a central bore in line with the cap bore and having a kerf bisecting both bores, a part of the kerf being struck on an arc to provide a recess, a hammer slidable in the central bore and having a crosshole, and a spring put under a load when the cap is screwed on, said spring consisting of a single wire occupying the crosshole and extending beyond the hammer to sink in bow-shape into the recess, thereby to key the hammer in place and press the hammer against the other end of the test piece.

4. In an explosion gage, a body having an anvil, a cap screwed onto the anvil and having a bore to contain a test piece for engagement at one end with the invil, a hammer carried by the cap to strike the other end of the test piece, and an annular shoulder embodied in the cap to exert pressure at a rim contact around said other end of the test piece thereby to clamp the test piece independently of the hammer and to leave the center area of the test piece unimpeded for the imprint of the hammer.

5. In an explosion gage, a cap having a bore to contain a test piece, the cap being open at one end and having a lid with a central bore at the other end, said lid having a kerf bisecting the central bore, a hammer, being slidable in the central bore and introducible at the open end of the cap through its test piece bore, and a single strand of spring wire transfixing the hammer with its ends extending from the sides thereof, said cap having slots emerging from the test piece bore and registering with the kerf, said slots guiding the wire ends to the kerf and aiding in dropping the hammer into the central bore.

6. In an explosion gage, a body having an anvil, a cap screwed onto the anvil and having a bore to contain a test piece to contact at one end with the anvil, a hammer carried by the cap to contact and strike the other end of the test piece, and central and perimetric confronting portions respectively on the anvil and cap to exercise clamping pressure between them on comparable central and rim parts of the ends of the test piece, the center-to-rim contact of the cap and test piece producing a greater moment of force on the test piece than the moment of force of the center-to-center contact of the anvil and test piece thereby to induce the test piece to rotate with the cap during screwing.

7. In an explosion gage, a body having an anvil, a cap screwed onto the anvil and having a bore to contain a test piece for engagement at one end with the anvil, a hammer carried by the cap to strike the other end of the test piece, and a shoulder outstanding from the cap to exert pressure at a rim contact around said other end of the test piece thereby to clamp the test piece independently of the hammer and to leave the center area of the test piece unimpeded for the imprint of the hammer.

JAMES S. McCORKLE.

REFERENCES CITED

The following references are of record in the file of this patent:

UNITED STATES PATENTS

| Number | Name | Date |
|---|---|---|
| 2,362,484 | Hickman | Nov. 14, 1944 |
| 2,454,793 | Grogan et al. | Nov. 30, 1948 |

OTHER REFERENCES

Tschappat: Article entitled "Experiments in Interior Ballistics"; Mechanical Engineering, August 1926, vol. 48, No. 8, page 819.